April 7, 1925.
J. H. HASTE
COMPOSITE FILM
Filed Oct. 2, 1922
1,532,818
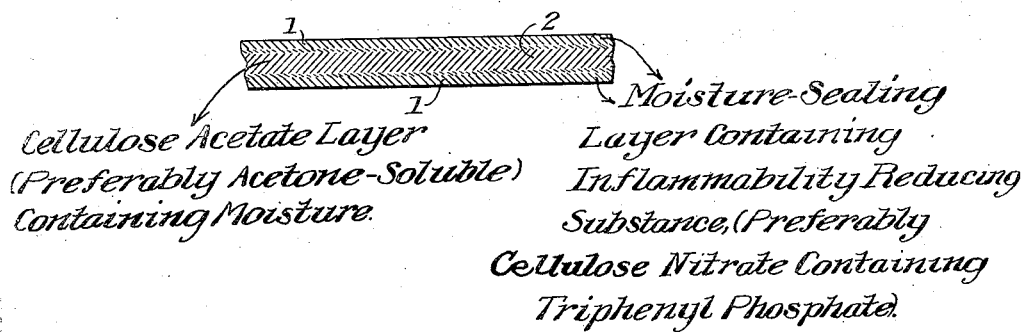
INVENTOR.
James H. Haste,
BY R. L. Stinchfield
ATTORNEY.

Patented Apr. 7, 1925.

1,532,818

UNITED STATES PATENT OFFICE.

JAMES H. HASTE, OF ROCHESTER, NEW YORK, ASSIGNOR TO EASTMAN KODAK COMPANY, OF ROCHESTER, NEW YORK, A CORPORATION OF NEW YORK.

COMPOSITE FILM.

Application filed October 2, 1922. Serial No. 591,862.

*To all whom it may concern:*

Be it known that I, JAMES H. HASTE, a citizen of the United States of America, residing at Rochester, in the county of Monroe and State of New York, have invented certain new and useful Improvements in Composite Films, of which the following is a full, clear, and exact specification.

This invention relates to composite films in which a cellulose acetate layer is associated with two cooperating layers of material. While films having my preferred construction are particularly adapted for use as supports for photographic light sensitive layers, as in motion picture films, they are not, of course, restricted to the photographic art. One object of the invention is to prolong the time through which the cellulose acetate layer remains flexible by means of cooperating layers one on each face thereof, said layers containing inflammability-reducing substances. Other objects will hereinafter appear.

In the drawing the single figure shows in fragmentary cross section upon an exaggerated scale a film embodying my invention.

Flexible films of cellulose acetate have come into wide use, both as protective coatings and as supports for photographic light sensitive emulsions, particularly in motion picture film. While such films, especially those made from the better grades of acetone-soluble cellulose acetate, have retained a practical degree of flexibility over useful periods, nevertheless such films sometimes become brittle after longer periods or under unfavorable conditions where excessive heat or dryness, or both, prevail.

I have discovered that the flexibility of cellulose acetate films may be prolonged to an unexpected degree without making them undesirably inflammable by covering each face thereof with a certain type of cooperative layer, such as one containing nitrocellulose for example, said layer containing inflammability-reducing substances.

Referring to the drawing, which shows one illustrative embodiment of my invention, a central layer 2 of flexible transparent acetone-soluble cellulose acetate is coated or sealed upon both faces with layers 1 which may, for example, be composed of flexible transparent nitrocellulose. I use the terms "cellulose acetate" and "cellulose nitrate" to indicate not only the pure substances but preferably mixtures of such substances with suitable colloidizing or modifying agents. For instance, the layer 2 may be formed from one of the compositions disclosed in U. S. Patent No. 1,342,601, P. C. Seel, June 8, 1920. The other layers may for example, be made by coating such a central layer with a dope or varnish in which 100 parts of nitrocellulose are mixed with 20 to 100 parts of fusel oil or butyl alcohol and 400 to 1200 parts of a mixture of acetone and methyl alcohol in equal proportions. In order to diminish the inflammability of the nitrocellulose layers, there is also added to this dope or varnish 10 to 30 parts of triphenyl phosphate.

When the dope is diluted with the larger proportions of acetone and methyl alcohol, it can be most conveniently applied to the faces of the cellulose acetate layer by a coating wheel or even coating brushes. The thicker dopes may be flowed in the usual film making apparatus. A dope or varnish of the type described above unites strongly to the surfaces of the cellulose acetate layer and after it becomes dried is substantially inseparable therefrom in use.

In the preferred embodiment of my invenion I make the nitrocellulose layers relatively thin by the use of dilute dope which moreover contains considerable amounts of triphenyl phosphate. In this way the prolonged flexibility of the cellulose acetate layer is obtained with a minimum increase in inflammability.

The increased life of the cellulose acetate layer, as far as flexibility is concerned, depends, I believe, upon the presence of moisture therein. Very small percentages of moisture influence the flexibility of the acetate layer to a remarkable degree. The nitrocellulose or equivalent layers greatly restrain the transfer or exit of this flexibility-inducting moisture from the cellulose acetate layer. It is to this moisture-sealing function of the cooperating outer layers that I attribute, to a large extent, the prolonged flexibility of the central or main layer. Under unusually dry or unusually warm conditions, or both, the moisture is retained in the central layer in quantities above the critical amounts necessary to induce flexibility. Of course, the moisture in the central layer is not perceptible to the touch, but may be detected and determined by the customary analytical methods. If films of the type described be cut up into strips which serve as the supports in motion picture films, the edges of the central layer 2 will be exposed. The area thus exposed is, however, so relatively minute that the loss of moisture through it, even under dry conditions, does not prevent a useful prolongation of the flexibility of the central acetate layer by the moisture-sealing layers.

Having thus described my invention, what I claim as new and desire to secure by Letters Patent is:

1. A composite film comprising a layer of cellulose acetate containing moisture which induces flexibility therein, said layer being covered on each face thereof with a layer which restrains the exit of said moisture from said first named layer, said second named layer containing inflammability-reducing substances.

2. A composite film comprising a transparent flexible layer of acetone-soluble cellulose acetate containing moisture, said layers being united to and covered on each face with a transparent flexible layer of nitrocellulose which restrains the exit of moisture from said cellulose acetate and contains an inflammability reducing substance.

Signed at Rochester, New York, this 26th day of September 1922.

JAMES H. HASTE.